United States Patent [19]

van der Lely et al.

[11] 4,183,468
[45] Jan. 15, 1980

[54] SPREADER

[75] Inventors: Ary van der Lely, Maasland; Cornelis J. G. Bom, Rozenburg, both of Netherlands

[73] Assignee: C. van der Lely N. V., Zg, Netherlands

[21] Appl. No.: 799,435

[22] Filed: May 23, 1977

[30] Foreign Application Priority Data

May 24, 1976 [NL] Netherlands ............... 7605530

[51] Int. Cl.² .................................. A01C 17/00
[52] U.S. Cl. ................................ 239/665; 239/687
[58] Field of Search .............. 239/665, 670, 687, 681

[56] References Cited
U.S. PATENT DOCUMENTS

| 3,157,403 | 11/1964 | van der Lely | 239/665 |
| 3,257,115 | 6/1966 | van der Lely | 239/665 |
| 4,030,641 | 6/1977 | Bailey et al. | 239/687 |

Primary Examiner—John J. Love
Attorney, Agent, or Firm—Mason, Mason and Albright

[57] ABSTRACT

A spreader for broadcasting fertilizer, seed or the like which is mounted on the rear of a tractor and has a hydraulic control for covering and uncovering a plurality of ports by closure members for feeding material from a hopper which includes such ports to an underlying rotatable spreading member. The actuating mechanism includes a hydraulic cylinder and plunger and a parallel tension spring whereby the cylinder, when supplied with hydraulic fluid under pressure, causes the plunger to extend outwardly to close the ports in a lower portion of the hopper which is cylindrical through a mechanical linkage coupling therewith. The spring tends to force the closure members to open the ports. The linkage coupling to the closure members includes a coupling arm which also functions to indicate relative to an arcuate leg of a supporting member with numbers thereon the amount that the ports are opened by the closure members. The same coupling arm is linked through an attached tag having limiting lugs to provide limited relative motion between it and a control arm to which the spring and hydraulic actuator are connected. The relative motion possible between the coupling arm and the control arm permits the engagement and disengagement of a resilient extension from a leg of the support member into a groove on a fastening member bolted to the end of the control arm whereby the hydraulic actuator can selectively free the control arm from being fastened thereby and by doing so also free the coupling arm so that the amount which the closure members cover the hopper ports is adjustable by the hydraulic actuator. Further, the portion of the hopper containing the ports is resiliently urged against the closure members by a spring connected to the closure members. Still further, by mechanical linkage including the arms of the supporting member, the entire lower portion of the hopper including the ports is turnable about a vertical axis to adjust the direction that the spreader broadcasts material relative to the tractor.

2 Claims, 5 Drawing Figures

— 4,183,468 —

SPREADER

SUMMARY OF THE INVENTION

This invention relates to a spreader for spreading granular and/or powdery material.

According to the present invention there is provided a spreader comprising a frame, a hopper and a rotatable spreading member, the hopper having at least one delivery port provided in a delivery part movable around the axis of rotation of the spreading member, the said delivery part being connected with a supporting member turnable with said part and fixable in at least two different positions around said axis, the said ported member is provided with a closure member for adjusting the aperture of the delivery port, the closure member being connected with an actuating mechanism, supported by said supporting member, the said actuating mechanism includes a hydraulic actuator, for adjusting the closure member.

The delivery port or ports of a spreader in accordance with the present invention can be readily closed or opened to a desired extent.

In an embodiment of the present invention, the actuating mechanism can be readily remote-controlled. An advantageous embodiment of the invention is obtained by providing the actuating mechanism with resilient means which exert a force on a control arm of the actuating mechanism in a direction opposite the force applied by the hydraulic actuator. The remote-control of the actuating mechanism can be made possible by providing the hydraulic actuator with connecting means for coupling it with the hydraulic system of a vehicle to which the device can be attached. Advantageously, the control arm is mounted for pivotal movement and the hydraulic actuator is connected between the control arm and a supporting member for the actuating mechanism.

The control arm may be supported by the supporting member independently of the closure member. Forces exerted by the hydraulic actuator will not be applied to the closure member so that displacement of the closure member will not be hindered thereby.

For a better understanding of the invention and to show how the same may be carried into effect, reference will be made by way of example to the accompanying drawings, in which:

Figure 1:
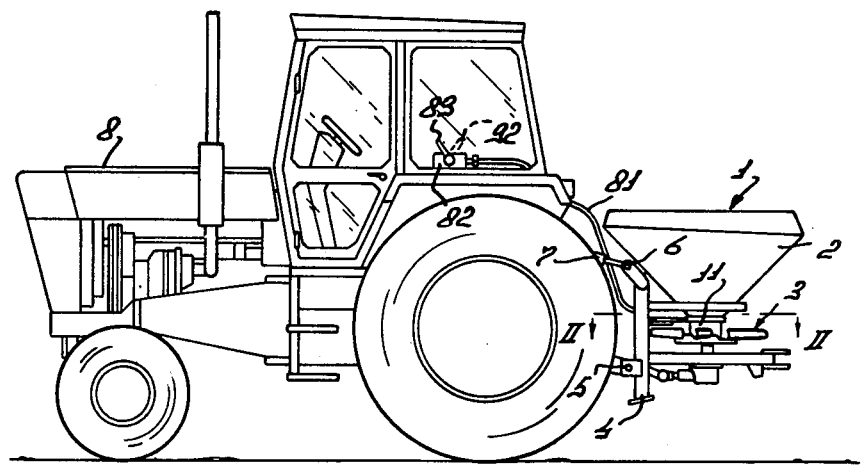
FIG. 1 is a side elevation of a spreader hitched to a tractor.
Figure 3:
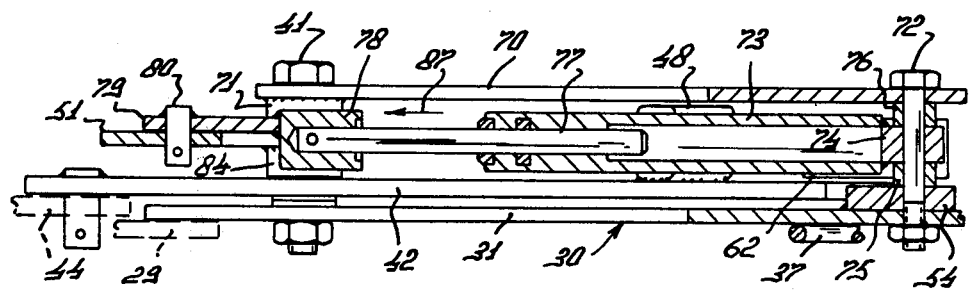
FIG. 3 is a sectional view taken on the line III—III in FIG. 2.

The spreader 1 in FIG. 1 comprises a hopper 2 and a spreading member 3. The spreader has a frame 4 with coupling members 5 and 6, by means of which the spreader is coupled with a lifting device 7 of the tractor 8.

The hopper 2 is provided on its lower side with an annular delivery part 11, the lower side of which bears on a plate 12 of the spreading member 3, which is provided with spreading arms 10. The delivery part 11 may alternatively be arranged on the spreader without bearing on the spreading member.

The delivery part 11 has three delivery ports 13, 14 and 15. Around the delivery part 11 is arranged a closure member 16 comprising a ring 17 surrounding the delivery part 11 and having fastened to it closure plates 18, 19 and 20. The ring 17 is provided with an arm 21 holding a spring comprising two helical coils 22 and 23, having ends 24 and 25 fastened bear on the delivery part 11. The ends 24 and 25 are guided between guide elements 26 and 27 secured to the delivery part 11.

The delivery part 11 is provided with tags 28 and 29, to which is fastened a supporting member 30. The supporting member 30 comprises two arms 31 and 32 arranged in the form of a V. The free ends of the V are pivotably connected with the tags 28 and 29. At the junction of the arms 31 and 32 the member 30 is provided with a tag 33 from which a pin 34 projects upwardly. The pin 34 can be inserted at will into any one of a plurality of holes 35 in a guide 36, which is secured to the frame 4 of the device. A spring 37 is arranged on the member 30 and a curved portion 38 of the spring 37 bears on the top side of the guide 36.

Near the tag 29 the arm 31 has fastened to it a vertical shaft 41. A coupling arm 42 is mounted for pivotal movement about the shaft 41 to afford a lever. Above the coupling arm 42, a control arm 43 is also mounted pivotalby on the shaft 41. One end of the coupling arm 42 is pivoted to a coupling line 44, which is pivotably connected to a tag 45 secured to the ring 17. The coupling arm 42 is provided with lugs 46 and 47. The lugs 46 and 47 are upwardly extending short sides of a curved rectangular tag 48. The control arm 43 extends between the lugs 46 and 47. The lugs 46 and 47 limit the movement of the arm 43 relative to the arm 42. The end 51 of the arm 43 has a plurality of openings 52, into one of which is fastened one end of resilient means in the form of a helical tension spring 53. The other end of the spring 53 is fastened to a tag 54 on the arm 31 of the member 30. The arm 32 of the member 30 is arcuate, the center of arc lying on the axis of the shaft 41. This curved portion of the arm 32 constitutes a guide 56 for the end of the arm 42. The curved portion 56 of the arm 32 is provided with graduations. An adjustable stop 57 is mounted on the curved portion 56 and can be fixed at will in any position along the graduations by means of a wing nut 58. To the arm 32 is secured a rod 59 of spring steel, the end of which is bent over upwardly and forms a latch pin 60. The rod 59 is fastened by a bolt 61 to the arm 32 is such a way that the rod 59 cannot turn about the center line of the bolt 61. To the control arm 43 is fastened a member 62 having a groove 63.

To the arm 31 of the member 30 is fastened a supporting plate 70, which is located at a distance above and parallel to the arm 31. One end of the plate 70 is fastened to the top of the shaft 41. On the shaft 41 beneath the plate 70 is arranged a spacer sleeve 71. A further spacer sleeve 84 is arranged below the arm 43 and above the arm 42. The other end of the plate 70 is fastened by means of a bolt 72 to the arm 31. A hydraulic cylinder 73 is rotatably mounted on the bolt 72, the cylinder having a mounting block 74 through which the bolt 72 extends. Above and below the mounting block 74 are arranged spacer sleeves 75 and 76 which hold the plate 70 and the cylinder 73 in the correct positions with respect to the arm 31. A plunger 77 is slidable within the cylinder 73. The end of the plunger projecting from the cylinder 73 is fastened to a coupling piece 78 having a plate 79, which is pivotally connected to the portion 51 of the arm 43 by means of a pin 80 which extends through one of the holes in the portion 51. The plate 79 and the spring 53 may be connected to other ones of the holes in the portion 51 to provide different operating characteristics. The portion of the cylinder 73 located near the mounting block 74 is connected to a conduit 81, which may be at least partly flexible. The conduit 81 is coupled with the hydraulic system of the tractor 8. FIG. 1 shows schematically a housing 82 provided with a control handle 83. The conduit 81 is connected to the housing 82, to which is also connected the hydraulic system of the tractor.

The use and the operation of the spreader are as follows.

Figure 2:
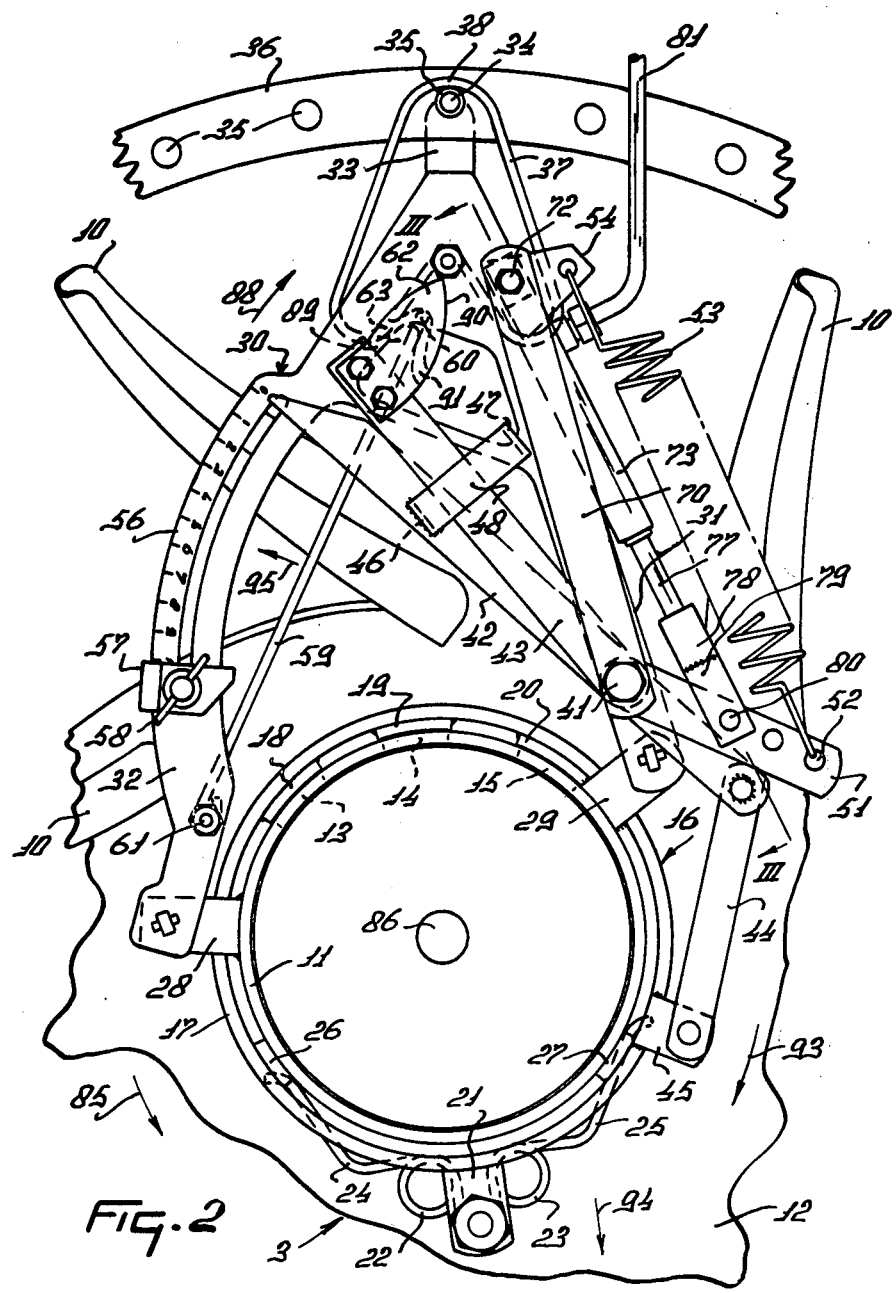
FIG. 2 is an enlarged plan view of the part of the spreader of FIG. 1.

In the position shown in FIG. 2 the ports 13, 14 and 15 are completely closed so that no material can flow from the hopper 2 to the spreading member 3. In this position the end of the coupling arm 42 is located near the digit 0 of the graduations on the guide 56. The control arm 43 is retained by the pin 60 in the position in which the ports are closed by the closure plates. In this position of the control arm 43 the spring 53 is under almost maximum tension. In order to open the delivery ports 13, 14 and 15 the closure plates 18, 19 and 20 with the ring 17 have to be turned about the delivery part 11 in the direction of the arrow 85 around the center line of shaft 86 of the delivery part 11 and the ejecting member 3. To this end, by actuating the arm 83 near the driver seat on the tractor, the hydraulic actuator is supplied with high-pressure hydraulic fluid through the conduit 81. The plunger 77 is thus moved in the direction of the arrow 87 so that the control arm 43 is moved about the shaft 41 and the member 62 is moved in the direction of the arrow 88. During this movement the pin 60 will shift relatively to the portion 89 of the groove 63 and emerge from the groove 63. This movement is aided by the resilient arm 59 being slightly biassed in the direction of the arrow 95 when in the position shown in FIG. 2. When the pin 60 is out of the groove 63, the pressure on the plunger 77 can be released.

When the pressure in the cylinder 73 is released, the control arm 43 will move under the action of the spring 53 in a direction about the shaft 41 opposite the direction of the arrow 88. The arm 43 will thus come into contact with the limiting lug 46 so that the arm 42 is thereafter carried along with the arm 43 and will also move about the shaft 41. During this movement of the arm 43 the ring 17 with the closure plates 18, 19 and 20 is moved in the direction of the arrow 85 about the center line of the shaft 86 owing to the coupling of the arm 42 via the link 44 and the tag 45 with the ring 17. The arm 42 will move about the shaft 41 until the end of the arm 42 comes into contact with the stop 57. In this position of the arm 42, which is determined by the position of the stop 57 of FIG. 2, the ring 17 with the closure plates 18, 19 and 20 will have turned about the delivery part 11 to an extent such that the plates 18 to 20 are completely located at the sides of the respective ports 13 to 15, which are thus completely open. The stop 57 is, in FIG. 2, at the digit 10 of the graduations on the guide 56. In the open state of the ports the arm 42 will remain in engagement with the stop 57, since the arm 43 remains in contact with the lug 46 under the action of the spring 53. The position of the stop 57 determines the position of the arm 42 about the shaft 41 and hence the extent to which the closure plates 18, 19 and 20 uncover the delivery ports 13, 14 and 15. If the stop 57 is instead put near, for example, the digit 6 on the guide 56, the ports will be opened by 0.6 of their total aperture.

When the arms 43 and 42 move about the shaft 41 in a direction opposite the arrow 88, the plunger 77 will be pushed into the cylinder 73 so that the fluid will flow back from the cylinder through the conduit 81 to the hydraulic system of the tractor 8. Opening the delivery ports to a greater or lesser extent can therefore be readily effected from the tractor can by slightly turning the arm 83 towards the position indicated by broken lines so that pressure is built up in the cylinder 73 to cause the arm 43 to be released from the pin 60.

To close the ports 13, 14 and 15, high-pressure fluid is again introduced through the conduit 81 into the cylinder 73 so that the plunger 77 is moved in the direction of the arrow 87. This causes the arm 43 to move in the direction of the arrow 88 about the shaft 41. During this movement the arm 43 will come into contact with the limiting lug 47 and the arm 42 will then be carried along by the arm 43 about the shaft 41. During the movement of the arm 43 about the shaft 41 in the direction of the arrow 88, the curved side 90 of the member 62 will engage the pin 60 and will cause the pin 60 to be displaced by the side 90 until the pin 60 enters the end 91 of the groove 63. In the position in which the pin 60 centers the end 91 of the groove 63 the arm 43 bearing on the cam 47 has turned about the shaft 41 to an extent such that the arm 42 occupies the position shown in FIG. 2. In this position of the arm 42 the closure plate 20 abuts the tag 29 of the delivery part 11, the ports 13 to 15 being then completely closed. At this point of the movement of the arm 43 in the direction of the arrow 88 the pressure in the cylinder 73 can be relieved, after which the arm 43 will move into the position shown in FIG. 2 under the action of the spring 53. The pin 60 will then move relatively to the groove 63 from the end 91 through the groove to the central portion of the groove 63, wherein the pin 60 will retain the arm 43 in the blocked state shown in FIG. 2. During this movement of the arm 43, with the pin 60 moving from the end 91 towards the center of the groove, the arm 43 will turn with respect to the arm 42 so that the arm 43 moves away from the lug 47 to the position shown in FIG. 2.

Building up pressure on the fluid in the conduit 81 and pumping the fluid into the cylinder 73 can be performed by moving the handle 83 into the position 92 indicated by broken lines in FIG. 1. The pressure in the cylinder 73 need only be built up when the arm 42 has to be moved in the direction of the arrow 88 for releasing the arm 43 from the pin 60 or for coupling the member 62 with the pin 60 to close the ports 13, 14 and 15.

Turning of the arm 42 about the shaft 41 and the resulting movement of the closure member 16 with the plates 18, 19 and 20 is opposed by fricton which is great enough to prevent the arm 42 from following the movement of the arm 43 about the shaft 41 when the arm 43 moves out of contact with the lug 47 into the position shown in FIG. 2. This frictional force impeding the movement of the arm 42 is produced by the friction between the arm 42 and the shaft 41, the friction in the hinges connecting the coupling link 44 to the tag 45 and to the arm 42 and the friction between the plates 18, 19 and 20 and the delivery part 11 as well as the friction between the plates 18, 19 and 20 and the ejector disc 3. In the case of a rotatable ejector disc moving in the direction of the arrow 93, the friction between the ejector disc and the plates 18, 19 and 20 will be such that the plate 20 will be urged against the tag 29. The friction between the plates 18, 19 and 20 and the sides of the delivery part 11 is increased by the spring including the helical coils 22 and 23, which press the plates 18, 19 and 20 against the outer side of the annular delivery part 11. The ends 24 and 25 engage the outer side of the annular part 11 so that the tag 21 to which the spring is fastened and hence the ring 17 are biassed in the direction of the arrow 94. Thus the plates 18, 19 and 20 are held by spring force on the annular part 11 around the delivery ports 13, 14 and 15. The plates 18, 19 and 20 will thus intimately engage the annular part 11 near the delivery ports 13 to 15.

Opening of the delivery ports 13, 14 and 15 to a position determined by the adjusted stop 57 and closing the delivery ports out of that position can thus be readily performed by means of the actuating mechanism comprising the arms 42 and 43, the hydraulic actuator formed by the cylinder 73 and the plunger 77 and the spring 53. The hydraulic system of the vehicle moving the spreader, for example the tractor in the embodiment shown, can be employed for supplying the hydraulic actuator of the actuating mechanism. The spreader is coupled preferably by means of a flexible conduit 81 with the hydraulic system, for example, at the housing 82 of the tractor. By moving the handle 83 into the position 92 pressure is built up in the cylinder so that the plunger 77 will move in the direction of the arrow 87. The return movement of the handle 83 into the position shown in FIG. 1 will relieve that pressure. It will be appreciated that the pressure in the cylinder 73 need be maintained only as long as it is required for the arm 43 to engage or disengage the pin 60.

In the embodiment shown the entire actuating mechanism is arranged on the V-shaped supporting member 30, which holds the delivery part 11 in a defined position relative to the frame, since the pin 34 is held in one of the holes 35 of the guide 36. Both the spring 53 and the cylinder 73 with the plunger 77 are coupled with parts of the actuating mechanism, which are free of the closure member 16. Thus the force exerted by the spring 53 on the various parts and the force exerted on the various parts when pressure is built up in the cylinder 73 will only be transferred to the member 30 rather than to the closure member 26. Therefore, the movement of the closure member 16 with respect to the delivery part 11 will not be affected by the forces exerted on the arm 42 of the actuating mechanism so that the closure member can be readily moved for opening or closing the delivery ports.

The actuating mechanism together with the member 30 can be turned about the shaft 86 by taking the pin 34 out of one of the holes 35, after which the pin 34 can be inserted into a further hole 35 of the guide 36. By turning the member 30 together with the actuating mechanism around the axis of the shaft 86 the ring 11 together with the closing plates 18–20 can be changed in position relative to the frame so as the change the direction in which material is broadcast relative to the intended direction of travel. Hereby the position of the part 11 and the member 16 relative to each other remains unchanged. The hydraulic control of the actuating mechanism for displacing the closure member readily permits remote-control of this actuating mechanism from the vehicle moving the spreader 1. The flexible connection between the tractor and the spreader permits of adjusting the actuating mechanism with the member 30. A ready closing and opening of the delivery ports may be required when the device is travelling through a bend at the head of a field so as to avoid excessive distribution of, for example, fertilizer at the head ends of the fields, when the device is employed for distributing granular or powdery fertilizer.

It is to be appreciated that the invention may also cover the features illustrated in the drawings, but not specifically described.

What we claim is:

1. A spreading member which comprises a frame, a hopper mounted on said frame, a rotatable spreading member underlying said hopper, a port in said hopper for delivering material from said hopper to said underlying spreading member, a closure member moveably mounted on said hopper for covering and uncovering said port, hydraulic actuation means interconnected to said closure member by a control arm and a linkage arm which causes said closure member to cover said port when said hydraulic actuator means is actuated, and resilient means connected to said closure member by said arms which urge said closure member to uncover said port, stop means adjustably connected to said hopper and adapted to be engaged by said linkage arm by the urging of said resilient means, said arms being connected to each other by a common shaft whereby they are rotatable about said common shaft and by limit means whereby said arms are relatively movable with respect to each other within limits, latching means for said control arm for latching said control arm in a relatively fixed position whereby said closure is covered, said latching means adapted to latch and unlatch said control arm by sequential movement of said control arm by said hydraulic actuation within the limits of said limit means, said hydraulic activation means and said resilient means being substantially parallel and connected to said control arm on one side of said common shaft and said latching means engaging said control arm on the other side of said common shaft and substantially farther therefrom than the connections of said hydraulic actuation means and said resilient means whereby small movements of said hydraulic actuation means and said resilient means cause larger movements of said control arm at said latching means and of said linkage arm to engage said stop means.

2. A spreader comprising a frame, a hopper and a rotatable spreading member, said hopper having at least one delivery port in a delivery part of said hopper, a closure member being provided in said delivery part which is movable relative to said port and adapted to adjust the effective opening of said delivery port, said closure member being connected with an actuating mechanism including a control arm which is pivotably movable about a hinge axis respectively to close and to open said delivery port to a selected effective size, said control arm being associated with latching means to secure said control arm and thereby said closure member whereby said delivery port is closed, said control arm being associated with stop means which is movable and selectively fixable in either one of at least two positions to determine the selected effective size of said port, said actuating mechanism including a hydraulic actuator connected to said control arm to move said arm alternatively into and from said latching means, said actuating mechanism including resilient means opposing said hydraulic actuator for moving said control arm against said stop means to determine the effective open size of said delivery port as selected, said resilient means and said hydraulic actuator being connected to said control arm at the same side of said hinge axis through the intermediary of a linkage arm which is also pivotable about said hinge axis.

* * * * *